United States Patent Office 2,866,714
Patented Dec. 30, 1958

2,866,714

METHOD OF TREATING KYANITE CONCENTRATES

Voldemars D. Svikis, Ottawa, Ontario, Canada, assignor to Her Majesty the Queen in the right of Canada, as represented by the Minister of Mines and Technical Surveys No Drawing. Application April 16, 1956
Serial No. 578,202

6 Claims. (Cl. 106—65)

This invention relates to a method for producing a volume stable dense and highly refractory material from kyanite concentrates.

This application is a continuation-in-part of application, Serial No. 545,504, filed November 7, 1955, now abandoned.

Kyanite, on being heated is converted to mullite which is a valuable highly refractory material. Kyanite occurs in considerable amounts in Canada and the United States, but the kyanite obtainable from known workable deposits in North America experiences a rapid, relatively large expansion during conversion to mullite and results in an easily shattered, porous, friable product.

For the production of superduty or mullite type firebrick or shapes, which demand high refractoriness, fairly high density and good mechanical strength, the firing behaviour of this type of kyanite is a detrimental feature. If used as a fortifying constituent in compositions for the production of high grade firebrick, rammed in place furnace linings or the like, the expansion and shattering of the individual grains of kyanite results in excessive porosity and a friable mechanically weak finished product, which is also unstable volumetrically on being reheated. Even though calcined at high temperatures and finely ground, similar results are obtained when incorporated in firebrick compositions. Further in the production of alumina-silica firebrick and the like it is normally required that the non-plastic ingredient be composed of a substantial percentage of coarse particles, so that optimum grading of grain sizes can be realized. But to purify the kyanite ore, it must be ground to a relatively fine grain size to insure that the kyanite particles are freed from associated mineral impurities.

Because of these difficulties a particular type of kyanite obtained in India has been in high demand for many years for the production of mullite type refractories. It also expands when heated to advanced temperatures, but the result is a hard, comparatively dense product, which can be readily crushed and graded for use as grog. The reason for the difference in behaviour of the two types of kyanite has been attributed to: (1) India kyanite is massive, whereas North American kyanite normally occurs as disseminated bladed crystals; (2) the former usually contains some corundum, the latter contains some excess silica.

According to accepted practice in industrial mineral industry in order to accomplish a sufficient degree of beneficiation, the ore of the disseminated type of kyanite is ground to a relatively fine grain size and the associated minerals removed by means of magnetic separation, flotation, etc. This provides a kyanite concentrate, which contains in excess of 90 percent kyanite mineral in finely divided form.

It is the object of the present invention to provide a method of treating North American kyanite concentrates to produce a dense, volume-stable and highly refractory aggregate (in form of briquettes or bricks) from which grog can be made for use in the manufacture of superduty and/or mullite type firebrick and the like.

It has been found that additives such as phosphoric acid, phosphorus pentoxide and soluble aluminum phosphates, each act as a mineralizer causing an intimate intergrowth of mullite crystals when the relatively pure kyanite concentrate is heated with the phosphate additive to form a dense and volume-stable mullite product.

The kyanite concentrates having a grain size which will pass at least 200-mesh sieve and preferably finer is uniformly mixed with 0.1 to 8 percent of the phosphate additive. The additives are preferably mixed or dispersed in the optimum amount of tempering water required prior to dry-pressing the batch into briquettes. This insures maximum ease of uniform distribution of the additive in the batch. The additive is more effective with the most finely ground kyanite concentrate and with kyanite concentrate which is not so fine but contains more impurities, since the impurities themselves act as a flux and tend thus to increase density, but at the same time the impurities reduce the refractoriness of the product. The particular proportion of phosphate additive used, within the range specified is thus governed by the finensss and purity of the kyanite concentrate.

The prepared batch is formed into briquettes under a pressure of 2,000 to 10,000 p. s. i. and fired at a temperature of at least 1550° C. to transform the kyanite into a volume-stable mullite product. The maximum temperature employed is below the fusion temperature of mullite (above 1800° C.). In general 1600° C. is a good operating temperature in relation to the different specific kyanite concentrates to be treated, having regard to particle size and the amount and character of the impurities therein. The time during which the briquettes are maintained at the firing temperature within the specified range, known as soaking time, is 0 to 10 hours. No practical advantage has been found by using a soaking time of substantially more than 10 hours. The most desirable firing temperature within the specified range and time of soaking a particular material is readily determined by test as will be apparent.

The briquettes may be in the form of brick and used as such, but since the product is most widely used in the form of grog or aggregate the briquettes are usually crushed and screened to provide a graded grog.

To illustrate the effect of the method the following comparative results are given.

(1) A kyanite concentrate containing 94% kyanite was ground to pass a 200 mesh sieve and mixed with an organic binder to assist briquetting, but without the phosphate additive, formed into briquettes under a pressure of 10,000 p. s. i. and fired at 1600° C. When the soaking time was 5 hours the apparent porosity of the product was 20.7%. When the soaking time was 10 hours the apparent porosity was 17.3%.

Apparent porosity is represented by the formula $$\frac{W-D}{V} \times 100$$

where D is the dry weight of the briquette, W is the water saturated weight and V the volume of the briquette.

(2) Batches of the same kyanite concentrate ground to pass a 200 mesh sieve without the organic binder, mixed with varying amounts of the phosphoric acid as an additive were formed into briquettes under a pressure of 10,000 p. s. i. and fired at 1600° C. with the following results:

| Soaking Time, hours | Percent additive | Apparent Porosity, Percent |
|---|---|---|
| 5 | 2 | 17.8 |
| 5 | 3 | 13.4 |
| 5 | 4 | 5.5 |
| 5 | 5 | 1.5 |
| 5 | 6 | 0.7 |
| 5 | 7 | 0.5 |
| 5 | 8 | 0.5 |

When the soaking time was 10 hours the apparent porosity was respectively 15.2, 10.2, 1.0, 0.5, 0.2, 0.2 and 0.2%.

(3) The same kyanite concentrate ground to pass a 270 mesh sieve and without the organic binder, mixed with varying small amounts of the phosphoric acid as an additive were formed into briquettes under a pressure of 10,000 p. s. i. and fired at 1700° C. with the following results:

| Soaking Time, hours | Percent additive | Apparent Porosity, Percent |
|---|---|---|
| 3 | 0.5 | 0.3 |
| 3 | 1.0 | 0.3 |
| 3 | 2.0 | 0.3 |

(4) The same kyanite concentrate ground to pass a 325 mesh sieve and without the organic binder, mixed with varying small amounts of the phosphoric acid as an additive were formed into briquettes under pressure of 10,000 p. s. i. and fired at 1700° C. with the following results:

| Soaking Time, hours | Percent additive | Apparent Porosity, Percent |
|---|---|---|
| 3 | 0.1 | 0.0 |
| 3 | 0.5 | 0.0 |
| 3 | 1.0 | 0.0 |
| 3 | 2.0 | 0.0 |

The particular proportions of phosphate additive used within the range specified is thus governed not only by the fineness and purity of the kyanite concentrate but also by the firing temperature and the soaking time at this temperature.

In each case when the apparent porosity of the briquettes was under 1 percent the briquettes were hard, dense and volume-stable owing to the transformation of the kyanite to mullite in the presence of the phosphate additive. When the briquettes were broken down, the product fractured into discrete, hard, substantially volume-stable fragments to form a grog, which can be easily graded into desirable grain sizes.

What is claimed is:

1. A method of treating concentrates of disseminated type kyanite to produce a dense, volume-stable product which comprises finely dividing the concentrates to pass through a screen having at least 200 meshes per inch, uniformly mixing the concentrate with at least 0.1% by weight of an additive being one of a group consisting of phosphoric acid, phosphorus pentoxide and soluble aluminum phosphates and tempering water, forming the mixture into briquettes under a pressure of 2,000 to 10,000 p. s. i. and firing the briquettes at a temperature of not less than 1550° C. and less than the fusion temperature of mullite to convert the kyanite into a dense, volume-stable mullite product.

2. The method as defined in claim 1 wherein the fired briquettes are crushed to produce dense, volume-stable and highly refractory grog.

3. A method of producing a dense, volume-stable refractory aggregate which comprises mixing a substantially pure concentrate of disseminated type kyanite having a particle size less than minus 200 mesh with 0.1 to 8% by weight of an additive, being one of a group consisting of phosphoric acid, phosphorus pentoxide and soluble aluminum phosphates and tempering water, forming the mixture into briquettes under a pressure of 2,000 to 10,000 p. s. i. and firing the briquettes without fusion at a temperature not less than 1550° C. to convert the kyanite into a dense, volume-stable mullite product.

4. The method as defined in claim 3 wherein the fired briquettes are crushed to produce dense, volume-stable and highly refractory grog.

5. The method defined in claim 4 wherein the additive is dissolved in water and the mixture to be briquetted is tempered with the solution so formed.

6. The method defined in claim 4 wherein the briquettes are substantially maintained at a temperature between 1550 and 1800° C. for a period of time between zero and 10 hours to ensure complete conversion of the kyanite to a dense, volume-stable mullite product.

References Cited in the file of this patent

UNITED STATES PATENTS

| 1,712,005 | Lambie et al. | May 7, 1929 |
| 1,741,920 | Curtis | Dec. 31, 1929 |
| 2,218,058 | Stalhane | Oct. 15, 1940 |

FOREIGN PATENTS

| 578,424 | Great Britain | June 27, 1946 |
| 627,826 | Great Britain | Aug. 17, 1949 |
| 150,578 | Australia | Mar. 23, 1953 |